Feb. 11, 1941.  M. MACHACEK  2,231,080
BAND SAW TABLE
Filed July 31, 1939  2 Sheets-Sheet 1

Inventor
Mike Machacek
By Caswell & Lagaard
Attorneys

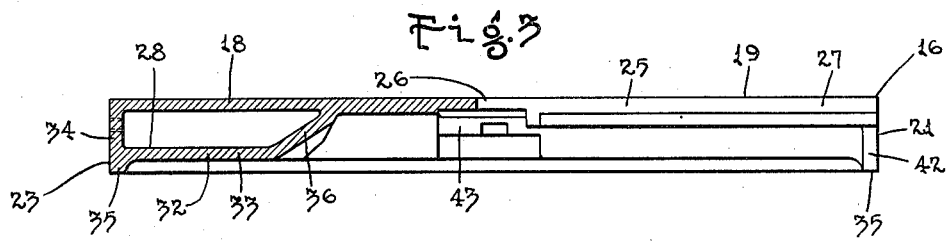
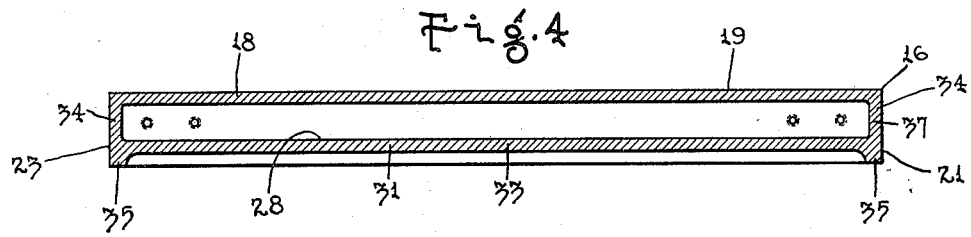
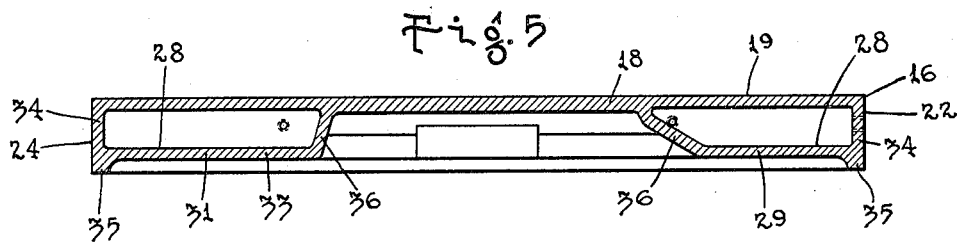
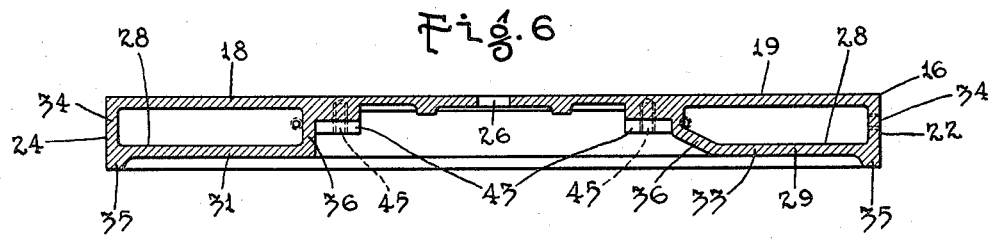
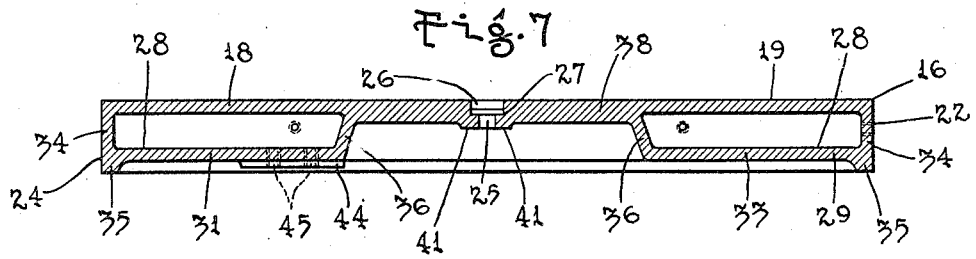

Patented Feb. 11, 1941

2,231,080

UNITED STATES PATENT OFFICE 2,231,080

BAND SAW TABLE

Mike Machacek, Northfield, Minn., assignor to Northfield Foundry and Machine Company, Northfield, Minn., a corporation of Minnesota Application July 31, 1939, Serial No. 287,460

3 Claims. (Cl. 29—68)

My invention relates to saw tables and particularly to a saw table formed with a slit extending through an edge thereof and inwardly into the table.

An object of the invention resides in providing a saw table which will be extremely rigid and substantial in construction.

Another object of the invention resides in procuring the desired results without unduly increasing the weight of the table.

A still further object of the invention resides in procuring the desired results without appreciably increasing the depth of the saw table.

Another object of the invention resides in providing a table which will be extremely serviceable and yet attractive in appearance.

An object of the invention resides in providing a saw table which can be used in place of the saw tables now employed with power saws and without appreciably reconstructing the framework of the saw.

A still further object of the invention resides in providing a saw table which can be manufactured economically and with equipment now available for the purpose.

Other objects of the invention reside in the novel combination and arrangement of parts and in the details of construction hereinafter illustrated and/or described.

In the drawings:

Fig. 3 is a longitudinal sectional view taken along the slit in the saw table and on line 3—3 of Fig. 2.

Fig. 4 is a longitudinal sectional view taken through one of the legs of the hollow frame structure of the table and on line 4—4 of Fig. 2.

Fig. 5 is a cross sectional view taken through the body of the table inwardly of the end of the slit and along line 5—5 of Fig. 2.

Fig. 6 is a cross sectional view taken through the slit at the end thereof and on line 6—6 of Fig. 2.

Fig. 7 is a cross sectional view taken through the slit intermediate its ends and on line 7—7 of Fig. 2.

In the use of saw tables formed with a slit extending through an edge thereof and inwardly into the table, such as employed with band-saws, I have found that springing of the free ends of the table at the outer ends of the slit usually occurs. Where the saw is used for sawing metal and particularly metal in large pieces, the weight of the metal, when concentrated on one side of the slit frequently causes the portion of the table supporting the same to sag and the edge of the metal in such cases catches on the opposite part of the table at the slit or on the filler strip in the slit and when the work is on both parts of the table the same is improperly supported. This would cause considerable inconvenience to the operator and at times require the stopping of the saw before the work could be readjusted together with inaccuracies in the work. Attempts have been made to overcome this difficulty by providing temporary connections between the ends of the saw table at the outer end of the slit and by deepening the flanges at the marginal portions of the table, as well as by the addition of numerous ribs to the underside of the table. The temporary securing together of the ends of the table requires an additional operation in replacing the saws which, when metal is being sawed, occurs quite frequently due to the use of saws of different width and tooth spacing to accommodate different types of work. All of these methods of overcoming the undesirable characteristics of springing of the table at the ends of the slit, have been found unsatisfactory due to the fact that even the deepening of the marginal flanges to an undesirable extent and the use of temporary attaching means, such as are now known in the art still do not prevent springing of the parts to a certain degree undesirable in the use of the saw table for the intended purpose. Applicant found that, with the instant invention, springing of the parts of the table is so slight as to be practically negligible and does not interfere with the use of the saw for its intended purpose even when the depth of the frame structure employed is considerably less than the depth of the flanges heretofore used with saw tables.

Figure 1:
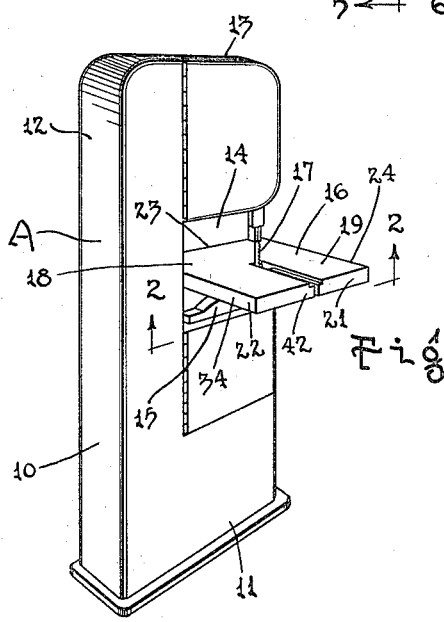
Fig. 1 is a perspective view of a band-saw illustrating an embodiment of my invention.

For the purpose of illustrating the invention, I have shown in Fig. 1 a band-saw A particularly adapted to be used for sawing metal and other materials. This band-saw comprises a hollow framework 10 including a base 11 having an upright 12 connected therewith. At the uppermost portion of the upright 12 is disposed an overhanging portion 13 which, together with the base 11, provides a recess 14 in the frame structure of the saw. From the base 11 extends upwardly a support 15 to which is attached the saw table 16 forming the subject matter of the instant invention. The saw table 16 is disposed within the recess 14. The frame structure of the saw A is hollow and supports the usual pulleys and other transmission which carry the saw blade 17. These structures, not forming any feature of the invention have not been shown in the drawings and will not be described.

Figure 2:
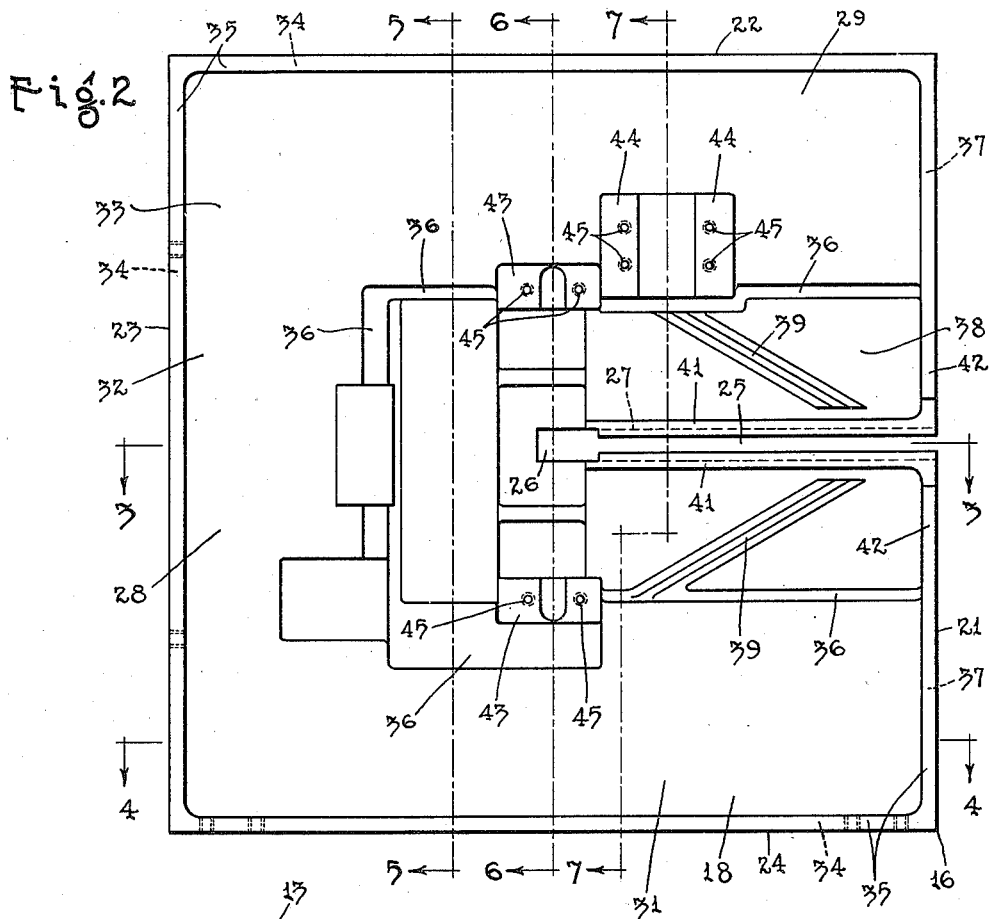
Fig. 2 is an inverted view of the saw table shown in Fig. 1 taken on line 2—2 of Fig. 1 and detached from the saw proper.

The saw table 16 is shown in detail in Figs. 2 to 7 inclusive and includes a saw table top 18 surfaced on the upper surface thereof as indicated at 19 to form a flat surface upon which the work to be sawed is manipulated. The table top 18 is rectangular in form, as shown in Figs. 1 and 2, having edges 21, 22, 23 and 24. Formed in the said table top is a slit 25 which extends through the edge 21 of the table top and inwardly toward the center of the same. At its innermost locality the said slit is formed with a slight enlargement 26 in which the saw blade 17 operates. The upper surface 19 of the table top 18 is rabbeted, as indicated at 27, to receive a filler strip which has not been illustrated in the drawings. This filler strip serves to close the slit and to provide a smooth surface over the entire area of the table top.

The table top 18 is reinforced by means of a hollow or tubular frame structure 28 which is U-shaped in form and which extends about the edges 22, 23 and 24 of the table top and straddles the slit 25. This frame structure includes a leg 29 extending along the edge 22 of the table top and another leg 31 extending along the edge 24 of the table top. The said frame structure further includes a connecting portion 32 which connects the two legs 29 and 31 together and which extends along the edge 23 of the table top. The two legs 29 and 31 terminate at the edge 21 of the table top. This frame structure 28 is constructed as follows:

In the construction of the saw table the same is preferably cast and the various parts of the said table, including the frame structure 28 and the table top 18 are cast integral. The frame structure 28 includes a reinforcing wall 33 U-shaped in form which is disposed below the table top 18 and spaced therefrom as clearly shown in Figs. 3 to 7, inclusive. This reinforcing wall is of outer dimensions corresponding with those of table top 18 and the edges thereof register with and are disposed below the edges of said table top. The inner edges of this wall are, however, spaced from the slit 25 but extend about the same so that the said wall and the frame structure formed thereby straddle the said slit. Between the table top 18 and the wall structure 33 at the marginal portion of the saw table and along the edges 22, 23 and 24 thereof is provided a web 34 which is integral with both of said parts and which forms the marginal portion of the saw table and which serves the same purpose as the flange usually formed on saw tables of ordinary construction. This web may extend below the under surface of the reinforcing wall 33 to form a bead 35 to conceal the under surface of the saw table and to facilitate machining of the table. Along the inner edges of the reinforcing wall 33 is provided another web 36 which extends between said wall and the table top 18. The web 34 is preferably substantially at right angles to the surface 19 of the table top 18 or the same may be caused to slightly flare for ornamental or other purposes. The form of this web preferably continues throughout its extent to give the saw table an attractive appearance. The web 36 may, however, be constructed in any form to accommodate the application of the saw table to the framework of the saw on which it is to be mounted. As will be noted in the drawings, the said wall is vertical at some localities and inclined at other localities. At the ends of the legs 29 and 31 of the frame structure 28 are provided other webs 37 which extend between the reinforcing wall 33 and the table top 18 and which form a continuation of the marginal portion of the table at the edge 21 thereof.

As will be noted in Fig. 2, the innermost edges of the reinforcing wall 33 are spaced from the slit 25. This leaves an intermediate portion 38 of said table top which is disposed between the legs 29 and 31 of the frame structure 28. This portion of the table top, as best shown in Fig. 7, is preferably thickened to make the same somewhat stronger. In addition, two diagonally disposed ribs 39 are employed which extend from the portions of the web 36 at the legs 29 and 31 inwardly and toward the slit 25. Also to strengthen the table top at the locality of the rabbet 27, two shallow ribs 41 are employed, one at each side of said slit. In addition, two flanges 42 are utilized which issue downwardly from the table top 18 and lie in continuation of the webs 37. These flanges extend up to the ribs 41. It will thus be seen with my invention that a table of relatively shallow dimensions is formed which is reinforced with a hollow tubular frame structure box-like in cross section and U-shaped in form which is integral therewith and straddles the slit in the table top.

The saw table as stated is supported on the supporting member 15 of the framework 10. For attaching certain of the parts of the table to the saw proper, a number of pads 43 and 44 are employed. These pads are surfaced and are drilled and tapped, as indicated at 45, to receive bolts, not shown in the drawings, which serve to attach and secure the parts together.

I have found that, with a table top 24 x 24 inches and with a frame structure of a depth of 1⅞ inches including the thickness of the table top, the springing at the ends of the table is so slight even with the ends unattached, that no interference whatsoever is had in the manipulating of work as heavy as one hundred pounds on the table. I have also found that tables utilizing the invention may be constructed in various sizes and the degree of springing kept within the same limits even with the largest of the tables now in common use with band-saws.

The advantages of my invention are manifest. The table may be used with any type of band-saw or similar saw used for sawing metals, wood or any other material. The table takes the place of the ordinary saw table now in use and may be employed without materially altering the framework of the saw. My improved saw table may be constructed in the customary manner with equipment now available for the purpose. My improved saw table utilizes only a slight additional amount of metal so that the weight thereof is not materially increased over and above saw tables now in common use. My improved saw table can be constructed at a cost only slightly above that required for ordinary saw tables. With my improved saw table the stresses occasioned during cooling of the casting are more equally distributed throughout the entire table so that warping of the table and subsequent change in the form of the table, after machining, is greatly reduced.

Changes in the specific form of my invention, as herein disclosed, may be made within the scope of what is claimed without departing from the spirit of my invention.

Having described my invention, what I claim as new and desire to protect by Letters Patent is:

1. A saw table comprising a table top having a slit extending through an edge thereof and inwardly into the top, a substantially U-shaped frame structure integral throughout its length with said top and disposed upon the underside of said top, said frame structure straddling the slit, said frame structure being box-like in cross section and being formed with a reinforcing wall spaced from the top and with webs disposed between the top and reinforcing wall and spaced from one another.

2. A saw table comprising a table top having a slit extending through an edge thereof and inwardly into the top, a substantially U-shaped frame structure disposed upon the underside of of said top and straddling the slit, said frame structure being tubular in form and integral throughout its length with said table top.

3. A saw table comprising a table top having a slit extending through an edge thereof and inwardly into the top, a substantially U-shaped frame structure disposed upon the underside of said top, said frame structure having legs straddling the slit and spaced from the slit, said frame structure being tubular in form and integral throughout its length with said table top, and ribs disposed upon the underside of the table top and issuing from said legs and extending toward said slit, said ribs being integral with said frame structure and table top.

MIKE MACHACEK.